No. 846,480. PATENTED MAR. 12, 1907.
L. S. LACHMAN.
PROCESS OF ELECTRIC WELDING.
APPLICATION FILED OCT. 28, 1905.

*Fig. 3.* *Fig. 4.*

Attest: Inventor:
E. Mitchell Lawrence S. Lachman
A. L. O'Brien by Dickerson, Brown, Raegener & Binney
Attys

UNITED STATES PATENT OFFICE.

LAURENCE S. LACHMAN, OF NEW YORK, N. Y., ASSIGNOR TO STANDARD PULLEY MANUFACTURING COMPANY, A CORPORATION OF NEW YORK.

PROCESS OF ELECTRIC WELDING.

No. 846,480.　　　Specification of Letters Patent.　　Patented March 12, 1907.

Application filed October 28, 1905. Serial No. 284,906.

*To all whom it may concern:*

Be it known that I, LAURENCE S. LACHMAN, a citizen of the United States, and a resident of the borough of Manhattan, city, county, and State of New York, have invented certain new and useful Improvements in Processes of Electric Welding, of which the following is a specification accompanied by drawings.

This invention relates to improved processes of electric welding for welding two sheets of metal together.

The invention may be applied to the construction of all kinds of utensils, pulleys, wheels, sheaves, pulley-frames, and other structures in which two metal parts are to be secured together, whereby the parts of the structures may be securely united to each other without the use of rivets, bolts, keys, and without interlocking connections.

While I have specified certain-named devices to which the invention relates and to which the process is particularly applicable, I am nevertheless not to be understood as limiting this invention to such devices, because the process may be used in any connection in which it is applicable.

Further objects of the invention will hereinafter appear; and to these ends the invention consists of the process of electric welding for carrying out the above objects embodying the steps hereinafter fully described and claimed in this specification.

Suitable apparatus for carrying out the process is illustrated in the accompanying drawings, in which—

Figure 1:
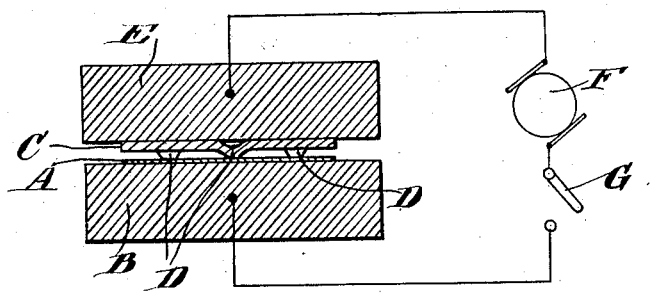
Figure 2:
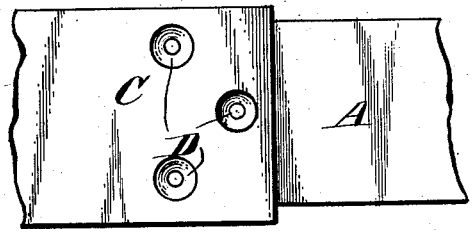
Figure 2:
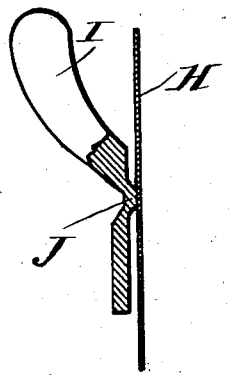
Figure 2:
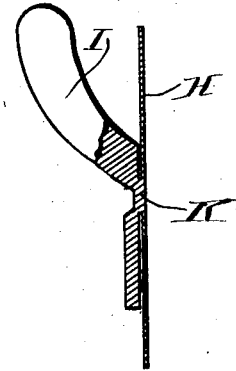

Figure 1 is a vertical sectional view of a suitable die or press and the parts of a sheet-metal utensil which are to be welded together electrically. Fig. 2 is a top plan view of the two sheets of metal before being placed in the press. Fig. 3 is a vertical sectional view of a portion of a utensil and a handle to be welded thereto; and Fig. 4 is a vertical sectional view of the portion of the utensil and the handle after welding, showing a section through the weld.

This invention is in some respects an improvement upon the processes disclosed in my copending applications, Serial Nos. 233,109 and 251,712, in which I disclose methods of making sheet-metal structures having portions of sheet metal welded together electrically by means of points or projections. I have heretofore proposed to weld two sheets of metal of the same thickness together by forming a projection on one sheet and placing it against the flat surface of the other sheet, passing a current of electricity through the sheets of metal and pressing the sheets together as the projection fuses. I have also proposed to form projections on both sheets of metal and place the projections opposite each other, then pass a current of electricity through the sheets and said projections, thereby fusing both projections and pressing the sheets of metal together to complete the weld. In these cases the sheets of metal have generally been of substantially the same thickness, and I have found that if said sheets are greater than a given thickness a point or projection on one sheet will not become securely welded to the other thick sheet when the point is placed upon the flat surface of said sheet, because the flat sheet without the point apparently does not become sufficiently hot or fused to form a perfect weld, and the parts may generally be pried apart, because the weld is superficial. On the other hand, I have found that when the two sheets of metal are excessively thin and each is provided with points and the points are placed one upon the other the resistance afforded to the current is so great that not only the points themselves, but portions of the thin sheets of metal, are actually fused to such an extent that an imperfect weld is formed—that is, the metal is burnt and the points of fusion are weak.

I have discovered that a perfect weld may be formed between a thin sheet of metal and another sheet of substantially thick metal by forming points or projections upon the thicker sheet and placing these points directly upon the flat surface of the thinner sheet, then passing a current of electricity through the two sheets and through the points and pressing the two sheets of metal together as the points are fused. By using a thin sheet of metal and another substantially thicker sheet having points and placing the points on the flat surface I have found that about the proper amount of resistance is afforded to the current to fuse the points and heat the thin sheet at the points of contact sufficiently to form a perfect weld which can hardly be seen on the reverse side of the thin sheet of metal, because the points or projections do not project through the thin sheet. Upon taking a section through one of the welds a perfect weld is found.

In accordance with this invention the thin sheet of metal A of Fig. 1 is placed upon the die B, and the thick sheet of metal C, provided with projections or points D, only one of which is shown by way of illustration and which may be punched out of the sheet, is placed upon the thin sheet and the upper die E brought down upon the two sheets at the same time that a current of electricity is passed through the dies and the sheets of metal from the generator F, connected in circuit and provided with a suitable switch G.

Fig. 2 is a top plan view of a thin sheet A and the thick sheet C, placed on top thereof, and the point or projection D. This process is found to have great utility in welding handles and other ears or projections upon utensils of all kinds and for welding handles on shovels or in any case in which a thick part is to be welded to a thin sheet.

In Fig. 3, H represents a thin sheet of metal, which may be a portion of a cooking utensil, as a pot or pan, and I is a handle of substantially thicker metal to be welded thereto, provided with points or projections J, of which there may be any desired number.

In Fig. 4 a section is taken through the weld after the weld has been completed, from which it will be seen that the sheet H and the thicker handle or projection I are perfectly welded at the point K and formed into one integral whole.

It is of course possible to weld two substantially thick sheets together by means of points or projections on each placed opposite each other and one on the other, because the points will fuse and weld under pressure when the current is applied and the metal will be of such thickness that the welds will not tear out; but it is not advisable to provide points on both a thick sheet and a thin sheet, because the resistance is so high that the thin sheet is melted and burnt at the points of contact. According to my present process, however, for welding thick and thin sheets the thin sheet is not burnt and perfect welds are obtained.

According to my present process the resistance of the thick metal is sufficient to enable the points to embed themselves in the heated thin metal, thereby making a perfect weld without projecting through on the other side of the thin metal. The points incorporate themselves in the metal of the thin sheet, forming a true weld, and perfectly satisfactory results have been obtained in welding thick metal three or four gages heavier than the thin metal.

The points or projections formed upon one of the sheets in carrying out this process are, as shown, widely separated and independent one from the other, and the series of points is of substantially the same total effective contact area as the total area of the final welds formed at the points. According to this mode of operation the plates may be said to be electrically riveted at separated and independent points.

I do not herein claim a product formed by my process, said product forming the subject-matter of my copending application, Serial No. 284,903, filed October 28, 1905.

Obviously some features of this invention may be used without others, and the process is not to be limited to all the details of description.

I therefore claim, and desire to obtain by Letters Patent, the following:

1. The process of electrically welding a thin piece of sheet metal to another relatively thicker piece, which consists in providing projecting portions upon the thicker piece of metal, placing said projections against the surface of the thin sheet of metal, passing a current through said sheets of metal and the projecting portions, thereby fusing said portions and heating the thin sheet of metal at the points of contact and simultaneously forcing the two sheets of metal together to securely weld one to the other.

2. The process of electrically welding a piece of substantially thin metal to another piece of relatively thicker metal, which consists in providing a point or projecting portion upon the thick piece of metal, placing said thick piece upon the thin piece with the said point or projection of said thick piece in direct contact with the surface of the thin piece of metal, passing a current of electricity through said pieces of metal and through the point or projection, thereby fusing said point and heating the thin piece of metal at the point of contact and incorporating said point in the metal of the thin piece forming a true weld and simultaneously forcing the two pieces of metal together to securely weld one to the other.

In testimony whereof I have signed this specification in the presence of two subscribing witnesses.

LAURENCE S. LACHMAN.

Witnesses:
 O. A. FOSTER,
 A. L. O'BRIEN.